(12) United States Patent
Bernard et al.

(10) Patent No.: US 8,716,426 B2
(45) Date of Patent: May 6, 2014

(54) METHOD FOR PREPARING AN ALLOPHANATE, ALLOPHANATE, AND LOW-VISCOSITY COMPOSITION CONTAINING THE ALLOPHANATE

(75) Inventors: Jean-Marie Bernard, Saint-Laurent d'Agny (FR); Johannès Schwarz, Lyons (FR); Philippe Olier, Lyons (FR)

(73) Assignee: Perstorp France, Saint-Priest (FR)

( * ) Notice: Subject to any disclaimer, the term of this patent is extended or adjusted under 35 U.S.C. 154(b) by 72 days.

(21) Appl. No.: 13/133,477

(22) PCT Filed: Dec. 8, 2009

(86) PCT No.: PCT/FR2009/002443
§ 371 (c)(1),
(2), (4) Date: Sep. 26, 2011

(87) PCT Pub. No.: WO2010/067005
PCT Pub. Date: Jun. 17, 2010

(65) Prior Publication Data
US 2012/0016073 A1    Jan. 19, 2012

(30) Foreign Application Priority Data
Dec. 8, 2008 (FR) ..................... 08 58328

(51) Int. Cl.
*C08G 18/22* (2006.01)
*C08G 18/16* (2006.01)

(52) U.S. Cl.
USPC ............ 528/57; 528/48; 528/49; 528/55; 528/67; 528/76; 252/182.2; 252/182.21; 252/182.22; 544/67; 544/222; 560/330; 560/335; 560/336; 560/355; 564/38; 564/44; 564/45

(58) Field of Classification Search
CPC ............ C08G 18/7837; C08G 18/225; C08G 18/161; C08G 18/2805; C08G 18/283; C08G 18/2835
USPC ......... 252/182.2, 182.21, 182.22; 528/48, 49, 528/55, 57, 67, 76; 544/67, 222; 560/330, 560/335, 336, 355; 564/38, 44, 45
See application file for complete search history.

(56) References Cited

U.S. PATENT DOCUMENTS

| | | |
|---|---|---|
| 6,420,508 B1 | 7/2002 | Danielmeier et al. |
| 6,590,028 B1 | 7/2003 | Probst et al. |
| 7,288,213 B1 * | 10/2007 | Charriere et al. .......... 252/182.2 |
| 2006/0180274 A1 | 8/2006 | Burckhardt et al. |
| 2009/0036630 A1 * | 2/2009 | Sasano et al. ................ 528/59 |

FOREIGN PATENT DOCUMENTS

| | | | | |
|---|---|---|---|---|
| EP | 1970394 | | 9/2008 | |
| EP | 2025693 | | 2/2009 | |
| JP | 08188566 A | * | 7/1996 | ............ C07C 275/60 |
| JP | 2004315598 | | 11/2004 | |
| JP | 2006335783 | | 12/2006 | |

* cited by examiner

*Primary Examiner* — Michael L Leonard
(74) *Attorney, Agent, or Firm* — Michael B. Fein; Eckert Seamans Cherin & Mellott, LLC

(57) ABSTRACT

A process for the preparation of an allophanate of one or more identical or different isocyanates, compositions obtained by the process, and uses of the compositions are disclosed. The process comprises reacting an isocyanate with at least one monoalcohol comprising an ether or polyether functional group in the presence of a bismuth-comprising catalyst and a metal compound as co-catalyst.

31 Claims, No Drawings

METHOD FOR PREPARING AN ALLOPHANATE, ALLOPHANATE, AND LOW-VISCOSITY COMPOSITION CONTAINING THE ALLOPHANATE

CROSS-REFERENCE TO RELATED APPLICATIONS

The present application is a 35 U.S.C. 371 National Stage Application of International Application No. PCT/FR2009/052443, Filed Dec. 8, 2009, which claims priority under 35 U.S.C. §119(a) to France Application No. 0858328, Filed, Dec. 8, 2008, each of which is incorporated herein by reference in its entirety.

BACKGROUND OF THE INVENTION

The present invention relates to a process for the preparation of allophanate, and to an allophanate and a polyisocyanate composition of lowered viscosity comprising the allophanate which is intended for two-component coating compositions, in particular paint compositions.

The invention relates in particular to a process for the preparation of allophanate by reaction of one (or more) isocyanate(s) with at least one monoalcohol comprising an ether or polyether functional group, the reaction being catalyzed by a bismuth-comprising compound.

Polyisocyanates are widely used in the coating industry, in particular in the paint industry, due to their numerous properties. The use is known in particular, as curing agents, of polyisocyanates comprising isocyanurate groups, due to their crosslinking capability.

However, the compositions of this type, obtained by trimerization of an isocyanate, have a relatively high viscosity which necessitates the use of a substantial amount of solvent.

In point of fact, new regulations relating to monitoring of the environment require the reduction of volatile organic compounds.

One of the possibilities in meeting these requirements consists in limiting the degree of conversion of the starting isocyanates, in particular of the diisocyanates, in order to minimize the formation of heavy compounds (polycondensates with a higher degree of polymerization, more particularly comprising more than one trimer unit) present in the trimerization medium which are responsible for the increase in the viscosity. To this end, the amount of catalyst is reduced for a set reaction time or the reaction time is reduced for a given amount of catalyst, in order to increase the true cyclotrimers/heavy compounds ratio.

The applicant company already markets products of this type, HDT (Hexamethylene Diisocyanate Trim er) and HDB (Hexamethylene Diisocyanate Biuret), denoted under the acronym LV for "Low Viscosity".

The disadvantages of these procedures are, firstly, a significant fall in the productive output and, secondly, an increase in the cost due to the amount of catalyst used for a given amount of isocyanurates.

The proposal has also been made, in the European patent applications EP 0 524 500 and EP 0 524 501, to carry out an allophanation reaction on a trimerization mixture or to carry out the trimerization in the presence of alcohols, which results in polyisocyanate mixtures comprising isocyanurate functional groups claimed as exhibiting a low viscosity. This process results in the formation of allophanates of polyfunctional isocyanates, which compounds increase, in a significant and harmful fashion, the viscosity of the compositions.

It is also known to add allophanates to compositions formed of polyisocyanates comprising isocyanurate groups, in order to reduce their viscosity. Thus, on carrying out the catalytic (cyclo)trimerization reaction and the allophanation reaction separately, the formation of allophanates of polyfunctional isocyanates, which compounds increase, in a significant and harmful fashion, the viscosity of the composition, is avoided.

Allophanates are generally obtained by reaction of a compound comprising an alcohol functional group with an isocyanate, followed by reaction of the carbamate functional group thus obtained with a new isocyanate molecule.

Processes for obtaining allophanates are known, which processes generally employ catalysts.

For example, it is known to prepare allophanates by using a quaternary ammonium as catalyst. Thus, allophanates are formed but trimers are also formed, which is undesirable.

It is also known to prepare allophanates by using tin-based compounds as catalysts. The reaction requires many hours and the tin-based compounds are toxic.

SUMMARY OF THE INVENTION

The invention thus provides a process for the preparation of allophanates which does not exhibit these disadvantages.

Thus, the invention provides, in a first subject matter, a process for the preparation of allophanate of one or more identical or different isocyanates, or of a mixture of different allophanates, by reaction of one (or more) isocyanate(s) with at least one monoalcohol comprising an ether or polyether functional group, the reaction being carried out in the presence of a bismuth-comprising compound as catalyst and of a metal compound as cocatalyst, the content of metal compound being from 0.5 to 100 ppm, with respect to the amount of monoalcohol.

This process is fast, it employs nontoxic catalysts and it makes it possible generally to obtain allophanates in a selective fashion. This is because the process generally avoids the formation of trimers in parallel with the formation of allophanates.

The invention also relates, in a second subject matter, to allophanates or mixtures of allophanates capable of being obtained according to the process described above.

The invention also relates, in a third subject matter, to a composition formed of tricondensate polyfunctional isocyanates, of lowered viscosity, comprising at least one true tricondensate polyfunctional isocyanate and an allophanate as described above.

The composition of the invention exhibits a significantly lowered viscosity, preferably lowered by at least ¼, advantageously approximately ⅓, more advantageously still by approximately ⅔, in the absence of solvent, with respect to the same composition not comprising compounds comprising allophanate functional groups according to the invention, for a given temperature.

Finally, the invention relates, in a fourth subject matter, to the use of this composition for the preparation of a coating.

DETAILED DESCRIPTION OF THE INVENTION

The process for the preparation of allophanate of the invention employs a monoalcohol comprising an ether or polyether functional group.

The term "monoalcohol" is understood to mean a hydrocarbon compound comprising one hydroxyl functional group.

Use is advantageously made of an alcohol comprising an aliphatic chain including alcohols comprising a cycloaliphatic chain or, preferably, an alcohol comprising a linear or weakly branched alkyl chain comprising just one OH functional group. The alcohol can be a heterocyclic alcohol of oxetane type.

The appropriate alcohols can also optionally comprise one or more double bonds.

The monoalcohol of the invention comprises an ether or polyether functional group, advantageously a (poly)alkylene oxide functional group, preferably a (poly)ethylene oxide functional group (in particular polyethylene oxide monoether advantageously comprising at most 10 ethylene oxide units on average).

Other alcohols which are particularly advantageous from the viewpoint of the low viscosity are the compounds of formula R—[O—CH($R_1$)—$CH_2$]$_n$—OH, in which $R_1$ is H, or an alkyl group, preferably a $C_1$-$C_8$ alkyl group, in particular a methyl group, or a polyether group, in particular a —$CH_2OR_{10}$ group, $R_{10}$ being a hydrocarbon chain, in particular a polyoxyalkylene chain, preferably a polyoxyethylene chain, n is an integer advantageously from 1 to 10, preferably from 1 to 5, and R is a linear or branched $C_1$-$C_{20}$ alkyl group or R is an $R_2$—CO— group, $R_2$ being a linear or branched $C_1$-$C_{20}$ alkyl group.

As mentioned above, the aliphatic chain of the compound comprising an OH functional group can additionally be substituted or interrupted by a cycloalkyl or heterocyclic group.

The OH functional group can be directly bonded to a carbon atom of the hydrocarbon ring or of the heterocycle.

Derivatives of silanol type are also appropriate.

Advantageously, the monoalcohol of the invention comprises less than 5 alkylene oxide units on average; it preferably comprises 2 or 3 alkylene oxide units on average. This makes it possible in particular to increase the NCO content of the allophanate obtained according to the process of the invention.

It is also possible to add, during the carbamation/allophanation reaction, a mixture of different compounds comprising alcohol functional group(s). Advantageously, only monoalcohols are employed as alcohol.

The process of the invention, according to a specific embodiment of the invention, employs several different monoalcohols. Advantageously, it employs at least 3 different monoalcohols, preferably at least 8 different monoalcohols.

In addition to the monoalcohols of the invention, other alcohols of different types can be employed. Mention is made, for example, of alkyl alcohols comprising a linear $C_1$-$C_{10}$ chain, in particular $C_4$-$C_8$ alcohols.

The allophanation process employs a catalyst which is a bismuth-comprising compound. Bismuth compounds exhibit in particular the advantage of not being toxic.

The bismuth compound is an organometallic compound comprising at least one molecule acting as ligand for the bismuth.

The bismuth compound is a compound of formula Bi($R_1$, $R_2$,$R_3$) with $R_1$, $R_2$ and $R_3$, which are identical or different hydrocarbon molecules, having a number of carbons of between 1 and 50 carbon atoms, preferably between 1 and 25 carbon atoms, and having at least one functional group capable of bonding to the bismuth atom and for which the pKa in water is greater than 1, preferably greater than 2.

The functional groups capable of bonding to the bismuth atom are generally chosen from carboxylic acids, alcohols or phenols, hydroxycarbonates, thiols, amines or carbamoyls (—NH—C(=O)). Preferably, these functional groups are carboxylic acid functional groups.

The molecules $R_1$, $R_2$ and $R_3$ can be aliphatic, cycloaliphatic, araliphatic, aromatic or heterocyclic; they can have a linear or branched structure and can optionally be interrupted by heteroatoms (oxygen, nitrogen, and the like).

The combination ($R_1$, $R_2$, $R_3$) can constitute one, two or three molecules.

Mention may be made, as examples of molecules having functional groups capable of bonding to the bismuth atom, of acetic acid, propionic acid, octanoic acid, decanoic acid, dodecanoic acid, palmitic acid, stearic acid, behenic acid, trimethylacetic acid, 2-ethylhexanoic acid, isodecanoic acid, isostearic acid, Guerbet acids, benzoic acid, naphthoic acid, lactic acid, citric acid, salicylic acid, gallic acid, carbonic acid, carbamic acids, phenol or diphenols.

Mention may be made, as examples of catalysts, of bismuth triacetate, bismuth tris(2-ethylhexanoate), bismuth tris(decanoate), bismuth tris(palmitate), bismuth subsalicylate, bismuth subgallate or bismuth lactate.

Mention may also be made, as examples of catalysts, of bismuth oxide derivatives Use may also be made of compounds which are precursors of the catalyst.

The preferred bismuth-based catalysts according to the present invention are bismuth triscarboxylates.

Bismuth triscarboxylates are good catalysts of the reaction for allophanates obtained from simple alkanols. These alkanols are monoalcohol or polyalcohol molecules formed of an alkyl chain carrying hydroxyl functional groups directly attached to the alkyl chain. Mention may be made, as examples, of n-propanol, n-butanol, 2-ethylhexanol, 2-butyl ethyl hexane-1,3-diol or 2,2,4-trimethylhexane-1,6-diol. In general, these alkanol molecules do not comprise metal compounds in their structures.

The amounts of catalyst are advantageously from 0.001% to 0.1%, in particular from 0.001% to 0.05%, as moles of metal, with respect to the moles of alcohol.

The process of the invention also employs a metal compound as cocatalyst, such as an alkali metal or alkaline earth metal carboxylate. The amount of this metal compound employed is from 0.5 ppm to 100 ppm, preferably from 1 to 70 ppm and advantageously less than 50 ppm, with respect to the amount of monoalcohol.

In the context of the use of monoalcohols according to the invention, namely monoalcohols comprising at least one ether or polyether functional group, that is to say polyalkylene glycols or ethoxylated fatty alcohols, the formation of isocyanurate compounds was observed concomitantly with the formation of the allophanate compounds, although the bismuth (resulting from the catalyst based on bismuth triscarboxylates)/hydroxyl functional groups molar ratio is identical.

Thus, the inventors have demonstrated that the presence of organometallic compounds present in these polyalkylene glycols or ethoxylated fatty alcohols was responsible for the coproduction of isocyanurate molecules. These organometallic compounds are impurities which originate from the synthesis of these alcohols. This is because the synthesis of polyalkylene glycols or ethoxylated fatty alcohols is generally initiated by reaction of an "initiator" molecule with an alkylene oxide molecule in the presence of a basic catalyst (for example sodium hydroxide or potassium hydroxide). At the end of the synthesis of these alcohol molecules, the reaction is blocked by acidification. In general, the acids used to neutralize the basic catalyst are weak acids, such as carboxylic acids. Mention may thus be made, as examples, of acetic acid, propionic acid or 2-ethylhexanoic acid.

The polyalkylene glycols or ethoxylated fatty alcohols thus comprise more or less high amounts of metal compound (in particular metal carboxylate), in particular of sodium acetate and/or potassium acetate.

The presence of high amounts (greater than 100 ppm) of metal compound (in particular sodium and/or potassium) in the monoalcohols used thus results in the formation of a large amount of isocyanurate trimer byproduct compounds in the synthesis of allophanate compounds catalyzed by bismuth-based compounds. The side reaction is harmful as it is highly exothermic and uncontrollable.

Thus, it has been shown that, when the amount of metal compound, such as sodium and/or potassium, present in the alcohol used for the allophanate synthesis is less than 100 ppm, preferably less than 70 ppm, then the synthesis of the allophanates prepared from ethoxylated fatty alcohols and/or in the presence of polyalkylene glycols and from an isocyanate and catalyzed by a bismuth-based compound (in particular bismuth triscarboxylate) takes place without coproduction of a large amount of isocyanurate trimers, generally less than 5%. The exothermic reaction is then controlled and the synthesis of allophanates takes place without specific problems.

Furthermore, it has also been shown that:

the suppression of the metal compounds present in the polyalkylene glycols or ethoxylated fatty alcohols by passing the alcohol over an ion-exchange resin, or the stoichiometric neutralization with a strong acid, such as para-toluenesulfonic acid, results in a reduction in the kinetics of formation of the allophanate catalyzed by the bismuth triscarboxylates. The presence of metal compound is thus necessary in the context of the process of the invention.

Metal carboxylates, in particular alkali metals and alkaline earth metals (Groups 1 and 2 of the Periodic Table), such as sodium carboxylates and potassium carboxylates, are effective cocatalysts of the reaction for allophanates which is catalyzed by bismuth carboxylates.

Consequently, in order to optimize the synthesis of an allophanate, the process of the present invention comprises the presence of an amount of metal compounds of from 0.5 to 100 ppm, preferably of 1 to 70 ppm, with respect to the amount of monoalcohol.

Said metal compounds are in particular in the form of salts of weak acids, these weak acids being acids with a pKa of greater than 2 and less than 6 and preferably being carboxylic acids.

According to a particularly advantageous embodiment, the cocatalyst/catalyst molar ratio (i.e., for example, sodium and/or potassium/bismuth ratio) used for the synthesis of allophanate is from 0.01 to 10 and preferably from 0.1 to 5.

These conditions thus make it possible to obtain a composition formed of allophanate(s) with a content of isocyanurate trimer of less than 5% by weight.

Said metal compound is thus essentially present in the monoalcohol used because of the process for the preparation of said monoalcohol. However, it is furthermore also possible to envisage the addition of said metal compound to the reaction medium.

According to a specific embodiment of the process of the invention, the starting isocyanate(s) is (are) (an) isocyanate monomer(s).

The present invention is not limited in the nature of the monomeric isocyanates employed. Thus, the monomeric isocyanates can be aliphatic, including cycloaliphatic and araliphatic, monoisocyanates, advantageously diisocyanates or triisocyanates, preferably diisocyanates, such as:

polymethylene diisocyanates and in particular hexamethylene diisocyanate, 2-methylpentamethylene diisocyanate, 4-(isocyanatomethyl)octamethylene diisocyanate and 2,4,4-trimethylhexamethylene diisocyanate;

isophorone diisocyanate, norbornane diisocyanate, 1,3-bis (isocyanatomethyl)cyclohexane (BIC), $H_{12}$-MDI and cyclohexyl 1,4-diisocyanate;

arylenedialkylene diisocyanates (such as OCN—$(CH_2)_p$-$\phi$-$(CH_2)_q$—NCO), p and q being identical or different integers from 1 to 6, preferably from 2 to 4;

or aromatics, such as tolylene diisocyanate.

Aromatic isocyanates and the isocyanates where the isocyanate functional group is carried by a neopentyl carbon are not preferred.

The preferred isocyanates targeted by the invention are those in which at least one, advantageously two and preferably three of the following conditions are fulfilled:

at least one, advantageously two, of the NCO functional groups is connected to a hydrocarbon backbone via a saturated ($sp^3$) carbon;

at least one, advantageously two, of said saturated ($sp^3$) carbons carries at least one, advantageously two, hydrogen(s). In other words, it has been found that best results are obtained when the carbon carrying the isocyanate functional group carries a hydrogen, preferably two hydrogens; in addition, it is even preferable for at least a third, advantageously at least half and preferably at least two thirds of said saturated ($sp^3$) carbons to be connected to said backbone via a carbon atom itself carrying at least one hydrogen, more preferably two;

all the intermediate carbons from which the isocyanate functional groups are connected to the hydrocarbon backbone are saturated ($sp^3$) carbons, some, preferably all, of which advantageously carry a hydrogen, preferably two hydrogens. In addition, it is even preferable for at least a third, advantageously at least half and preferably at least two thirds of said saturated ($sp^3$) carbons to be connected to said backbone via a carbon atom itself carrying at least one hydrogen, more preferably two.

Generally, the preferred starting isocyanates (monomers) are those comprising at least one polymethylene sequence (comprising from 2 to 6 methylene units).

Preference is given to the isocyanates, in particular aliphatic diisocyanates, especially $C_1$-$C_{10}$ alkyl isocyanates, in which the alkyl chain is linear or weakly branched. The term "weak branching" is understood to mean the absence of tertiary and neopentyl carbon.

HDI, IPDI, NBDI, $H_{12}$-MDI and MPDI are particularly preferred.

Generally, as aliphatic isocyanates as a general rule exhibit a lower viscosity than cycloaliphatic isocyanates, it will be preferable to avoid the use of isocyanate allophanates comprising cycloaliphatic functional groups when the desired effect is that of lowering the viscosity of isocyanurate (poly) isocyanates obtained from isocyanates comprising aliphatic functional groups.

According to the specific embodiment of the process of the invention where the starting isocyanate(s) is (are) (an) isocyanate monomer(s), this consists of a reaction of the (identical or different) monomer(s) with an alcohol in order to form a carbamate, in the presence of the catalyst, and a simultaneous or subsequent reaction of the carbamate with (a) monomer(s) (which are identical to or different from one another and identical to or different from the preceding monomers) in order to obtain an allophanate or a mixture of allophanates.

Use will advantageously be made of the same catalyst for the carbamation reaction and for the allophanation reaction. However, different catalysts can be used.

The carbamation and allophanation reactions can be carried out in two steps, for example by increasing the temperature of the reaction medium until the carbamation reaction takes place and by subsequently increasing the temperature until the allophanation reaction takes place.

The two reactions can also take place simultaneously by increasing the reaction temperature straight away up to the allophanation temperature.

The process of the invention comprises a conventional carbamation reaction, followed by a conventional allophanation reaction, it being possible for the two reactions to be catalyzed by one and the same catalyst or by a combination of catalysts and it being possible for the two reactions to take place simultaneously in a single reactor.

In a first step, the isocyanate(s) used for the allophanation reaction is (are) reacted in the presence of the allophanation catalyst with one or more monoalcohol compound(s). The reaction is carried out at a temperature which is advantageously from approximately 80° C. to approximately 100° C., when the carbamation and the allophanation reactions are carried out in two steps, or directly at a temperature of the order of 100° C. to 180° C., when the carbamation and allophanation reactions are carried out simultaneously.

The reaction is generally continued until a level of NCO corresponding to the consumption of at least 80%, preferably greater than 99%, of the alcohol functional groups is obtained.

When the carbamation reaction proper and the allophanation reaction are split up, it is possible, after carbamation, in a second step, to raise the temperature of the reaction medium up to approximately 100 to 180° C., preferably to the vicinity of 140° C. for HDI, in order to carry out the allophanation reaction, the latter being carried out in the presence of the allophanation catalyst.

Small amounts of dimers may also be formed, depending on the temperature employed.

The reaction time is advantageously less than 3 hours.

The allophanation reaction is carried out so as to predominantly obtain monoallophanates, as defined below.

It is possible to use a different isocyanate from that used in the carbamation reaction. A mixed allophanate is then obtained.

The isocyanate (NCO) functional groups/hydroxyl (OH) functional groups ratio employed is preferably greater than 2, better still greater than 4. In order to obtain predominantly monoallophanates, the isocyanate (NCO) functional groups/hydroxyl (OH) functional groups ratio is advantageously high. It is advantageously greater than 4 and preferably greater than 8.

The allophanation reaction is carried out so that the residual amount of carbamates (incompletely converted intermediate) is low (generally less than 30%, advantageously less than 20%, preferably less than 10%, more preferably still less than 5%, by weight). This is because the presence of a significant amount of carbamate increases the viscosity of the composition, which is undesirable.

Generally, the (Carbamate functional groups resulting from the alcohol molecule(s) used to prepare the allophanate)/(Allophanate functional groups resulting from the alcohol molecule(s) used to prepare the allophanate) ratio is less than 0.5, preferably less than 0.2 and advantageously less than 0.1.

The reactions are monitored by measuring the NCO contents.

Advantageously, the residual monomers are removed by distillation and recycled.

The process of the invention can be continuous (for example carried out in a tubular device) or batchwise.

The allophanates of the present invention generally correspond to the general formula (II):

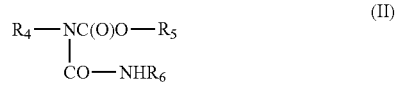

in which:

$R_4$ and $R_6$, which are identical or different, are a hydrocarbon group, in particular an aliphatic, cycloaliphatic, heterocyclic or aromatic hydrocarbon group, comprising a true or derived isocyanate functional group, and $R_5$ is the residue of a monoalcohol compound comprising an ether or polyether functional group after reaction of the hydrogen of the OH functional group.

The term "derived isocyanate functional group" is understood to mean, in this case, the carbamate, urea, biuret, urethane, uretidinedione, acylurea, blocked isocyanate or allophanate functional groups, with the exclusion of the isocyanurate functional group.

When $R_4$ is identical to $R_6$, reference will be made to homoallophanates, obtained by condensation, with a carbamate formed by reaction of an isocyanate of formula $R_4NCO$ with an alcohol of formula $R_5OH$, of a second isocyanate of formula $R_6NCO$, $R_6$ being identical to $R_4$.

The allophanates can also be obtained by condensation, with the carbamate, of a second isocyanate $R_6NCO$, $R_6$ being different from $R_4$, in which case reference will be made to mixed allophanates.

Advantageously, the mixture of allophanates of the invention comprises at least ¼, advantageously at least ⅓ and preferably at least ½ (by weight) of monoallophanates.

The mixture can also comprise bisallophanates, trisallophanates and heavy allophanates, as well as, to a minor extent, carbamates of (the) isocyanate(s) ($R_4NCO$ and/or $R_6NCO$) and of alcohol ($R_5OH$).

It is highly desirable for the mixture to comprise at most ½ (by weight), advantageously at most ⅓ and preferably ⅙ of heavy allophanates (comprising more than three allophanate functional groups).

The monoallophanate is obtained from an alcohol molecule carrying a primary or secondary hydroxyl functional group converted to an allophanate functional group.

Thus, a monoallophanate exists when the following condition is confirmed: (Total number of allophanate functional groups per molecule of compound carrying allophanate functional group(s))/(Number of identical or different isocyanate chains involved in the allophanate functional groups carried by the molecule of compound carrying allophanate functional group(s))=½.

A bisallophanate is a molecule which is characterized in that it comprises two allophanate functional groups separated by a chain which is at least partially a hydrocarbon chain.

The bisallophanate molecule comprises 3 isocyanate monomers and 2 alcohol molecules, the hydroxyl functional groups of which have been converted to allophanate functional groups.

The trisallophanates are defined in the same way as the bisallophanates.

In addition, according to the invention, it is also possible to add, to the tricondensate polyfunctional isocyanates, a combination of different homoallophanates, of different mixed allophanates or of a mixture of these two categories or also a mixture of homoallophanates and/or mixed allophanates obtained with different alcohols.

The term "heavy allophanates" is understood to mean the allophanate products not falling within any of the categories defined above.

In particular, allophanates comprising a derived isocyanate functional group (biuret and/or isocyanurate functional group) and at least one allophanate functional group and compounds comprising at least four allophanate functional groups, also denoted by the term tricondensate allophanates, fall within the category of the heavy allophanates.

According to another specific embodiment of the process of the invention, the starting isocyanate(s) is (are) (a) urethane(s).

The reaction for the preparation of the allophanate compounds is characterized by reaction of a molecule having at least one isocyanate functional group with a molecule having at least one urethane functional group, normally known as carbamate, characterized by the sequence R—NH—C(=O)—O—.

The molar ratio of the NCO functional groups/carbamate functional groups is generally from 1 to 50, advantageously from 3 to 25 and preferably from 5 to 20.

The reaction temperature is from 20° C. to 200° C., preferably from 100 to 180° C.

The amounts of catalyst are advantageously from 0.001 to 0.1%, in particular from 0.001 to 0.05%, as moles of metal, with respect to the moles of carbamates.

The isocyanate (NCO) functional groups/carbamate functional groups ratio is advantageously high. Use will preferably be made of a ratio of greater than 2, better still of greater than 4, a ratio of the order of 8 being particularly advantageous.

The urethane compounds used as starting compounds are compounds known to a person skilled in the art, as is their preparation.

Insofar as the carbamate functional group results from the reaction of a molecule having at least one isocyanate (NCO) functional group with a molecule having at least one hydroxyl (OH) functional group, the catalyst can be added from the start of the reaction when the molecule with the isocyanate functional group is brought into contact with the molecule carrying the hydroxyl functional group.

It is possible either to mix all of the constituents or to carry out successive reactions.

According to a specific embodiment of the process of the invention, the reaction of the isocyanate with the monoalcohol can also be carried out in the presence of antioxidant compounds as cocatalysts. These antioxidant compounds are provided in particular in the form of a mixture comprising a hindered phenol and a phosphite triester.

The phosphites which can be employed are, for example, represented by the formula $(R_1O)_3P$, each $R_1$ being, independently of one another, an alkyl group of 1 to 20 carbon atoms or an aryl group, if appropriate substituted by an alkyl group of 1 to 20 carbon atoms, it being possible for the alkyl groups to be, if appropriate, substituted by a halogen, such as chlorine.

Mention may be made, among the preferred phosphites, of monophosphites, such as triethyl phosphite, tributyl phosphite, tris(2-ethylhexyl) phosphite, tridecyl phosphite, trilauryl phosphite, tris(tridecyl) phosphite, tristearyl phosphite, triphenyl phosphite, tris(nonylphenyl) phosphite, tris(2,4-di (t-butyl)phenyl) phosphite, diphenyl decyl phosphite and diphenyl tridecyl phosphite; di-, tri- or tetraphosphites derived from polyols, such as distearyl pentaerythritol diphosphite, di(tridecyl)pentaerythritol diphosphite, di(nonylphenyl)pentaerythritol diphosphite, tetraphenyl tetramidecyl pentaerythritol tetraphosphite, tetraphenyl dipropylene glycol diphosphite and tripentaerythritol triphosphite; diphosphites derived from bisphenol compounds, such as di($C_{1-20}$ alkyl)bisphenol A diphosphites and 4,4'-butylidenebis(3-methyl-6-(t-butyl)phenyl di(tridecyl) phosphite); polyphosphites, such as hydrogenated bisphenol A phosphite polymers, and tris(2,3-dichloropropyl) phosphite.

More particularly, the process of the invention comprises the use of tributyl phosphite.

The expression "hindered phenol" denotes the phenol compounds comprising at least one substituent in the ortho position.

More particularly, the antioxidants of hindered phenol type can be chosen from phenols substituted in the ortho position, 2,6-dialkylphenols, bisphenols, amides of β-(3,5-di(t-butyl)-4-hydroxyphenyl)propionic acid or esters of β-(3,5-di(t-butyl)-4-hydroxyphenyl)propionic acid with mono- or polyvalent alcohols.

Examples of antioxidants of hindered phenol type are 2,6-di(t-butyl)-para-cresol, 1,3,5-trimethyl-2,4,6-tris(3,5-di(t-butyl)-4-hydroxybenzyl)benzene, tris(3,5-di(t-butyl)-4-hydroxybenzyl)isocyanurate, stearyl β-(3,5-di(t-butyl)-4-hydroxyphenyl)propionate, 2,6-di(t-butyl)-4-methylphenol, pentaerythrityl tetrakis((3,5-di(t-butyl)-4-hydroxyphenyl) propionate), bis(β-(3,5-di(t-butyl)-4-hydroxyphenyl)ethyl) substrate or N,N'-bis(3-(3',5'-di(t-butyl)-4'-hydroxyphenyl) propionyl)hexamethylenediamine. More particularly, the process of the invention comprises the use of 2,6-di(t-butyl)-4-methylphenol.

Thus, a particularly advantageous embodiment of the present invention comprises the reaction of an isocyanate with a monoalcohol in the presence of 2,6-di(t-butyl)-4-methylphenol and tributyl phosphite.

It has been found that the presence of the abovementioned antioxidant compounds makes it possible to reduce the coloring of the reaction medium.

The invention also relates to the allophanate(s) or mixtures of allophanates capable of being obtained according to the process of the invention.

The allophanates of the invention can be employed in isocyanate compositions, both in aqueous compositions and in compositions comprising an organic solvent, such as toluene.

The invention also relates to a composition formed of tricondensate polyfunctional isocyanates, of lowered viscosity, comprising at least one true tricondensate polyfunctional isocyanate and an allophanate(s) or mixtures of allophanates obtained according to the process of the invention.

The (cyclo)tricondensate polyfunctional isocyanates of the invention correspond to the following general formula:

in which A is:
an isocyanurate group of formula:

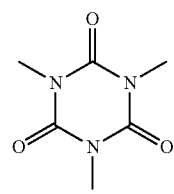

one of its derivatives, such as the iminooxadiazinediones with the following formula:

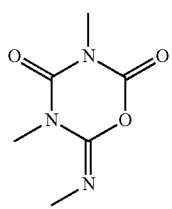

one of its derivatives, such as the oxadiazinetriones with the following formula:

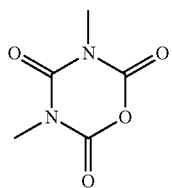

a biuret group of formula:

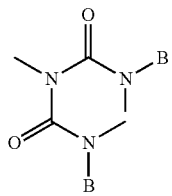

B being H or a hydrocarbon group, that is to say a group comprising carbon and hydrogen and also optionally other atoms (O, S, Si, and the like), preferably having from 1 to 20 carbon atoms; or a group of formula:

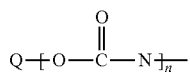

in which n is an integer from 3 to 4, and in which $R_1$, $R_2$ and $R_3$, which are identical or different, are a hydrocarbon group, in particular an aliphatic, cycloaliphatic, heterocyclic or aromatic hydrocarbon group, comprising a true or derived isocyanate functional group, Q is a hydrocarbon group, preferably an alkyl group, as defined for $R_1$ to $R_3$, m is an integer from 0 to 2.

The term "derived isocyanate functional group" is understood to mean the carbamate, urea, biuret, urethane, uretidinedione, isocyanurate, acylurea, iminooxadiazinedione, oxadiazinetrione and blocked isocyanate functional groups.

The tricondensate polyfunctional isocyanates can be homotricondensates (when $R_1$, $R_2$ and $R_3$ are identical) or heterotricondensates (when at least one of $R_1$, $R_2$ and $R_3$ is different from the others).

The mixtures of tricondensate polyfunctional isocyanates are defined as being a combination of different homotricondensate polyfunctional isocyanates, of different heterotricondensate polyfunctional isocyanates or a mixture of the two categories.

Reference will be made to true tricondensate polyfunctional isocyanate when $R_1$, $R_2$ and $R_3$, which are identical or different, are an -A-X group, A being a hydrocarbon chain, that is to say a chain comprising at least carbon and hydrogen, and X being a hydrogen atom or an NCO group.

It is preferable for X to be an NCO group.

In other words, the term "true tricondensate polyfunctional isocyanate" is understood to mean the products of theoretical (cyclo)condensation obtained by condensation of three moles of monomers, advantageously of isocyanates, preferably diisocyanates, indeed even triisocyanates (identical or different), with the exception of the compounds originating from the condensation of more than four monomers and/or comprising allophanate groups, and also the isocyanurate oligomers obtained by oligomerization of isocyanurate (poly)isocyanates.

Everything which was described above relating to the allophanates or mixtures of allophanates applies identically for the composition, in particular the nature of these compounds.

Advantageously, the composition comprises at least one true isocyanurate polyisocyanate.

Advantageously, the composition comprises at least 5%, preferably at least 15%, of allophanate(s) or mixtures of allophanates according to the invention.

The composition formed of tricondensate polyfunctional isocyanates, of lowered viscosity, of the invention can be prepared according to any method known to a person skilled in the art for the preparation of a composition.

The (cyclo)tricondensate polyfunctional isocyanates can be obtained by (cyclo)condensation, in the presence of a catalyst, of one or more identical or different first monomeric isocyanate(s) until the desired degree of conversion has been obtained.

The (cyclo)condensation reaction is advantageously a (cyclo)trimerization reaction, which is carried out in the presence of a (cyclo)trimerization catalyst known per se.

The (cyclo)tricondensate polyfunctional isocyanates and the allophanates are mixed according to a method known to a person skilled in the art, until the desired viscosity is obtained.

Advantageously, the isocyanate(s) used for the preparation of the (cyclo)tricondensate polyfunctional isocyanates is (are) identical to the isocyanate(s) used for the preparation of the allophanates.

It is also possible, in order to reduce the viscosity of a tricondensate polyfunctional isocyanate formed of a higher alkyl (comprising more than 10 carbon atoms), which is optionally branched, cycloalkyl or aromatic group, thus with a higher viscosity than that of a polyisocyanate formed of a lower alkyl (comprising at most 10 carbon atoms) group, to add, to the trimerization product, an allophanate of one or more isocyanate(s) different from those used for the preparation of the (cyclo)tricondensate polyfunctional isocyanates, exhibiting a lower viscosity than that which would be obtained by using an allophanate of one or more isocyanate(s) identical to those used for the preparation of the (cyclo) tricondensate polyfunctional isocyanates.

To this end, the isocyanate(s) from which the allophanate derives will advantageously be one or more isocyanate(s) formed of a linear alkyl group, in particular HDI.

The cyclo(condensation) is carried out under the normal conditions for the catalytic trimerization of isocyanates.

Mention may be made, by way of example, for the tricondensates comprising isocyanate functional groups, of the conventional reaction of HDI by catalysis in the presence of an aminosilylated derivative, in particular a silane or a disilazane, preferably hexamethyldisilazane (HMDZ), such as described in EP 57 653, or in the presence of a quaternary ammonium catalyst.

The reaction conditions comprise, in particular for a reaction catalyzed by HMDZ, an amount of catalyst of the order of 1.2% by weight, with respect to the weight of HDI, a reaction time of approximately 2 h 30 and a temperature of approximately 120° C.

Under these conditions, the degree of conversion of the isocyanate functional groups is 32.7%, which corresponds to an isocyanurate (poly)isocyanate mixture being obtained for which the level of true trimer functional groups formed of HDI (comprising a single isocyanurate ring) is of the order of 50% by weight.

Mention may also be made of the reactions catalyzed by carboxylic acids in the presence of water in order to obtain condensates comprising biuret unit(s) (patent FR 86 12 524).

The compositions obtained according to the invention comprise true tricondensate polyfunctional isocyanates and heavy condensates, obtained by catalytic (cyclo)condensation of the starting monomeric isocyanate(s), primary monoallophanate and allophanate compounds, such as di- or triallophanates or heavy allophanates, alcohol or mixture of alcohols employed for the carbamation reaction.

The composition according to the invention is particularly advantageous for tricondensates comprising biuret units generally generating high viscosities. However, when isocyanurate-based tricondensates are used, it is preferable for the amount of components comprising biuret units not to be high (less than 50%, preferably less than 25%, advantageously less than 10%).

However, even when the content of biuret units is from 0.5 to 5% by weight of the isocyanurate units, excellent results are still obtained.

The composition according to the invention preferably comprises virtually no allophanates comprising tricondensate units, in particular isocyanurate obtained by cyclotrimerization of the starting isocyanate. Advantageously, it comprises less than 15% by weight, preferably less than 5% by weight, more preferably still less than 1% by weight, with respect to the total weight of the composition.

Another subject matter of the invention is thus a composition formed of tricondensate polyfunctional isocyanates, of lowered viscosity, comprising at least one true tricondensate polyfunctional isocyanate and at least one monoallophanate.

Another subject matter of the invention is a composition formed of tricondensate polyfunctional isocyanates, of significantly lowered viscosity, comprising at least one true tricondensate polyfunctional isocyanate and at least one monoallophanate, said composition corresponding to at least one of the following conditions:

a monoallophanate/(monoallophanate+true trimer) ratio by weight from 2.5 to 99%, advantageously from 3 to 60% and preferably from 3.5 to 40%, the tricondensates result from a tricondensation reaction for which the degree of conversion of the identical or different isocyanate monomer or monomers to give tricondensate polyfunctional polyisocyanates present in the composition is greater than 8%, preferably 10% and advantageously 15%.

Advantageously, it is preferable for the compositions formed of tricondensate polyfunctional isocyanates, of lowered viscosity, comprising at least one true tricondensate polyfunctional isocyanate and at least one allophanate, to correspond to the first condition above, indeed even to both conditions above.

It is possible, in order to obtain compositions of low viscosity comprising tricondensate polyfunctional isocyanates from cycloaliphatic isocyanates, to proceed in the same way as described above and optionally to add a small amount of solvent (generally less than ⅓, advantageously less than ¼ and preferably less than ¹/₁₀, by weight, with respect to the total weight of the composition).

The compositions obtained according to the invention can be in the form of powders and can provide a lowered viscosity during the change to the molten state, in comparison with the products not comprising monoallophanates.

The compositions, in their various solvent-based, aqueous or aqueous/organic formulations or in the form of powders, can also comprise protective groups for the isocyanate functional groups which are identical or different. The isocyanate functional groups can be partially or completely protected. The ratio of free isocyanate functional groups to blocked isocyanate functional groups is selected by a person skilled in the art according to the application targeted.

The compositions of the invention make it possible to limit the amount of solvent employed, in comparison with the existing compositions of lowered viscosity.

The compositions obtained according to the invention can be used in aqueous formulations with optionally addition of formulation aids, such as ionic or nonionic surfactants, or reversible or irreversible grafting to the isocyanate functional groups of various polyoxyalkylene compounds, such as polyethylene glycol derivatives or polyoxyethylenated amines.

These compositions formed of polyisocyanates comprising isocyanate functional groups which are optionally partially or completely blocked can also result in emulsions or suspensions, such as described in FR 2 703 357 and EP 0 691 993.

The polyols can, in addition, act as formulation aids for these polyisocyanate compositions in order to prepare aqueous solutions, to prepare emulsions or to prepare dispersions.

Likewise, these compositions can be used to prepare powder or solvent-based polyurethane compositions or polyurethane compositions in aqueous or aqueous/organic solution which are optionally blocked by temporary and/or permanent blocking agents. The choice of the polyol is then dependent on the application targeted.

The compositions which are subject matters of the present invention are used with conventional additives for coatings, namely wetting agents, pigments, leveling agents, scratch-resistance agents, mar-resistance agents and any other compound known to a person skilled in the art used in the above-mentioned applications.

Mention may be made, among the numerous advantages exhibited by the process for the preparation of the composition according to the invention, in addition to the lowered viscosity, of the fact that the process makes it possible to rapidly and easily regulate the viscosity by adjusting the amount of one or other of the components (tricondensate polyfunctional isocyanates or allophanate(s)) of the mixture without having to resort to a complete synthesis from the starting monomers and the alcohol.

Finally, the invention relates to the use of a composition described above for the preparation of a coating, in particular of paint.

The following examples illustrate the invention.

The NCO content is expressed either as % of NCO per 100 g of mixture or as mole of NCO per 100 g of mixture.

EXAMPLES

The products used are:
HDI: hexamethylene diisocyanate
Tolonate HDT®: HDI-based isocyanurate polyisocyanate sold by Perstorp, the content of isocyanate functional groups of which is 22% by weight, and with a viscosity of the order of 2400 mPa·s at 25° C.

Tolonate HDT LV2®: HDI-based isocyanurate polyisocyanate sold by Perstorp, the content of isocyanate functional groups of which is 23% by weight, and with a viscosity of the order of 600 mPa·s at 25° C.

LR 9046®: HDI-based isocyanurate polyisocyanate sold by BASF, the content of isocyanate functional groups of which is 23.3% by weight, and with a viscosity of the order of 1033 mPa·s at 25° C.

Rhodasurf LA 30®: ethoxylated $C_{12}$-$C_{14}$ alcohols, CAS number: 68439-50-9, product sold by Rhodia Rhodasurf ISA 2®: ethoxylated $C_{16}$-$C_{18}$ alcohols Rhodasurf L 3®: ethoxylated $C_{10}$-$C_{16}$ alcohols, CAS number: 68002-97-1, product sold by Rhodia. The average molecular weight is 321.

Rhodasurf L 2®: ethoxylated $C_{10}$-$C_{16}$ alcohols, CAS number: 68002-97-1, product sold by Rhodia. The average molecular weight is 280.

K KAT XC 8203®: bismuth carboxylate sold by King Industry; the bismuth content is 12% by weight Polyethylene/polypropylene glycol copolymer with a weight of 2500: CAS RN: 9003-11-6

Ethylene glycol: CAS RN 107-21-1

Rhodocoat® X-EZM 502®: water-dispersible polyisocyanate based on hexamethylene diisocyanate (HDI) which is essentially characterized by the presence of isocyanurate rings and, to a lesser extent, of biuret functional groups and of dimer (diazetidinedione) rings. Its NCO content is approximately 18.4% and its viscosity is of the order of 3600 mPa·s at 25° C.

DMCHA: N,N-dimethylcyclohexylamine, CAS No. 98-94-2, BASF

Mixture of ethoxylated phosphate esters with an average molar mass of 710 g/mol, the first acidity of which is 90 mg KOH/g.

The analytical methods used are described below.

Method for Assaying the Isocyanate Functional Groups

This method is well known to a person skilled in the art. It corresponds to an assaying of the isocyanate functional groups carried out by reaction with a known amount of dibutylamine added in excess. The unreaced dibutylamine is assayed by titration with an HCl solution of known strength. The difference between the unreacted dibutylamine and the dibutylamine added at the start represents the amount of dibutylamine which has reacted with the isocyanate functional groups. The content of isocyanate functional groups present in the reaction medium is thus accessible.

Method for Analyzing the Distribution of Oligomers

Use is made, as analytical method, of gel permeation chromatography (GPC) coupled to infrared detection. The infrared analyzer makes it possible to distinguish the different functional groups of each oligomer. A known amount of sample to be analyzed is injected into a combination of two PL GEL columns in series. The eluent is dichloromethane stabilized with amylene. Benzonitrile is used as internal standard (100 microliters per 10 ml of dichloromethane).

Method for Measuring the Viscosity

It concerns a method well known to the person skilled in the art.

This method employs a Rheomat RM 300 rheometer from Lamy. The product to be characterized is introduced into a vessel. The stirring module, which measures the viscosity at a given shear rate, is started. The apparatus gives the value of the viscosity of the product at the given temperature and over one minute. The stirring module is chosen according to the target viscosity range.

The measurement temperature is 25° C. Generally, the measurements are taken for a shear gradient of 100 $s^{-1}$.

Example 1

Synthesis of an HDI and Rhodasurf LA 30 Allophanate Compound

This test is carried out with an NCO/OH molar ratio of 32 and with a bismuth/Rhodasurf LA 30 molar ratio of 0.02%.

726 g of HDI (4.32 mol), then 96.6 g of Rhodasurf LA 30 (0.28 mol) and 0.09 g of K KAT XC 8203 are charged, under a stream of nitrogen, to a three-necked reactor equipped with a stirrer. The reaction medium is heated in order to reach the temperature of 140° C. The reaction medium is maintained at this temperature for approximately 1 hour. The NCO content of the reaction medium is regularly measured by the dibutylamine assaying method. The reaction is halted by addition of 0.03 g of para-toluenesulfonic acid when the NCO content of the reaction medium corresponds to the theoretical content expected. After 30 minutes, the temperature of the reaction medium is allowed to return to ambient temperature.

The NCO content of the starting reaction medium is 1.031 mol per 100 g. The NCO content of the final reaction medium is 0.956 mol of NCO per 100 g. The theoretical NCO content at the end of the reaction is 0.984.

Two successive thin film distillations are subsequently carried out under vacuum (under 1 mmHg approximately) at a temperature of 160° C. in order to remove most of the unreacted monomer.

The amount obtained after distillation is 162 g, which corresponds to a yield of the order of 20%.

The final product is characterized by the following data:

NCO content: 0.261 mol of NCO per 100 g, i.e. a % by weight of 10.96%.

Infrared:

3240 $cm^{-1}$: absorbance corresponding to the allophanate NH

1719 $cm^{-1}$: absorbance corresponding to the allophanate C=O

1535 $cm^{-1}$: absorbance corresponding to the allophanate CONH group

1765 $cm^{-1}$: absorbance corresponding to the uretidinedione functional group

Slight presence of residual carbamate, of biuret and of isocyanurate functional groups The distribution of oligomers obtained after separation by gel permeation chromatography and infrared analysis is given below.

TABLE 1

| Type of oligomer | % by weight |
| --- | --- |
| HDI | 0.33 |
| Rhodasurf LA 30 and HDI carbamate | 0.8 |
| True HDI dimer (2 HDI chains and one uretidinedione ring) | 1.2 |
| True HDI biuret | 2 |
| Oligomers comprising allophanate units | 95.67 |

Examples 2 to 6

Syntheses of HDI and Rhodasurf LA 30 Allophanate Compounds

Example 1 is repeated using Rhodasurf LA 30 as alcohol (denoted ALC 1 in the table) but with the modification of certain parameters: different NCO/OH ratio, presence of a diol or presence of a polyol, and reaction time. The polyol used is a polyethylene glycol/polypropylene glycol copolymer.

TABLE 2

| Ex. No. | A HDI in g | A HDI mole | A ALC 1 in g | A ALC 1 mole | Polyol A in g | NCO/OH ratio | A Cata. in g | A para-toluenesulfonic acid (TsOH) in g | Reaction time |
|---|---|---|---|---|---|---|---|---|---|
| 2 | 712 | 4.23 | 191.5 | 0.535 |  | 15.8 | 0.17 | 0.034 | 55 min |
| 3 | 714 | 4.25 | 95.6 | 0.267 | 0.94 | 15.9 | 0.09 | 0.021 | 65 min |
| 4 | 714 | 4.25 | 192.2 | 0.534 | no | 15.8 | 0.17 | 0.052 | 60 min |
| 5 | 713 | 4.24 | 192.2 | 0.534 | 0.92 | 15.8 | 0.21 | 0.056 | 70 min |
| 6 | 356 | 2.12 | 189.4 | 0.529 | no | 8 | 0.19 | 0.046 | 71 min |

Polyol = poly(ethylene glycol-propylene glycol)

Characteristics of the Compounds Obtained

TABLE 3

| Ex. No. | A final product in g | Yield in % | NCO content as % by weight | Viscosity in mPa · s 25° C. Rheomat |
|---|---|---|---|---|
| 2 | 374.5 | 41.5 | 12.26 | 228 |
| 3 | 166 | 20.5 | 10.5 | 261 |
| 4 | 370 | 40.8 | 11.76 | 216 |
| 5 | 342 | 38 | 11.76 | 212 |
| 6 | 353 | 64 | 11.34 | 317 |

Comment:
The amount of residual HDI present in the products is always less than 0.3%.

Examples 7 to 9

Syntheses of HDI and Rhodasurf ISA 2 Allophanate Compounds

The procedure is the same as for the preceding examples using Rhodasurf ISA 2 as ethoxylated fatty alcohol. The other alcohol used is ethylene glycol.

TABLE 4

| Ex. No. | A HDI in g | A HDI mole | A ALC 1 in g | A ALC 1 mole | Other alcohol A in g | NCO/OH ratio | A Cata in g | A TsOH in g | Reaction time |
|---|---|---|---|---|---|---|---|---|---|
| 7 | 352 | 2.09 | 183.4 | 0.51 |  | 8.2 | 0.02 | 0.08 | 68 |
| 8 | 350 | 2.08 | 94 | 0.26 | no | 15.8 | 0.02 | 0.07 | 65 |
| 9 | 360 | 2.14 | 96.5 | 0.27 | 1.02 | 14.2 | 0.02 | 0.08 | 57 |

Polyol = poly(ethylene glycol-ran-propylene glycol)

Characteristics of the Compounds Obtained

TABLE 5

| Ex. No. | A final product in g | Yield in % | A residual HDI as % by weight | NCO content as % by weight | Viscosity in mPa · s 25° C. Rheomat |
|---|---|---|---|---|---|
| 7 | 300 | 56 | 0.09 | 9.95 | 277 |
| 8 | 164 | 39 | 0.11 | 11.13 | 205 |
| 9 | 176 | 38.5 | less than 0.05 | 11.42 | 237 |

Example 10

Synthesis of HDI and Rhodasurf L 3 Allophanate Compound

Example 1 is repeated but using Rhodasurf L 3 as ethoxylated alcohol. As for examples 2 to 6, some other parameters, such as NCO/OH ratio, presence of a diol or presence of a polyol, and reaction time, can be modified.

The polyol used is a polyethylene glycol-polypropylene glycol copolymer.

TABLE 6

| Ex. No. | A HDI in g | A HDI mole | A ALC 1 in g | A ALC 1 in mole | Polyol A in g | NCO/OH ratio | A Cata in g | A TsOH in g | Reaction time |
|---|---|---|---|---|---|---|---|---|---|
| 10 | 393 | 2.34 | 193.4 | 0.595 | no | 7.86 | 0.19 | 0.058 | 77 min |

Characteristics of the Compound Obtained

TABLE 7

| Ex. No. | A final product in g | Yield in % | NCO content in mol/100 g | NCO content as % by weight | Residual HDI content | Viscosity in mPa·s 25° C. Rheomat |
|---|---|---|---|---|---|---|
| 10 | 366 | 62.4 | 0.265 | 11.13 | 0.35 | 493 |

Examples 11 to 13

Preparation of Compositions According to the Invention

The products of examples 7 to 9 are mixed for 24 h on a pot roller with a polyisocyanate of Tolonate HDT type exhibiting the following characteristics.

Viscosity=2184 mPa·s at 25° C., % NCO=21.4%, 100% solids content

The characteristics of the various bulk compositions are given in the following table:

TABLE 8

| Example No. | Product Example No. | % HDT by weight | % Product by weight | Viscosity at 25° C. (mPa·s) | NCO % |
|---|---|---|---|---|---|
| 11 | 7 | 70 | 30 | 1047 | 17.9 |
| 12 | 8 | 70 | 30 | 935 | 18.3 |
| 13 | 9 | 70 | 30 | 982 | 18.4 |

Examples 14 to 16 (Comparative)

Commercial Compositions

These are commercial products having the references given below:

TABLE 9

| Example No. | Product | % HDT | Viscosity at 25° C. (mPa·s) | NCO % |
|---|---|---|---|---|
| 14 | LR9046 | 100 | 1033 | 23.3 |
| 15 | HDT LV2 | 100 | 749 | 23.0 |
| 16 | HDT-LV | 100 | 2184 | 21.4 |

Application Examples 17 to 22

Preparation of the Formulation of the Acrylic Varnish

This is a two-component varnish formulation for motor vehicle repair application.

Part A

The compounds are introduced with stirring (Dispermat stirring device) in the order in the following table:

TABLE 10

| Product | Amount (g) | Nature or function | Manufacturer |
|---|---|---|---|
| Setalux 1907 BA-75 | 1162.5 | Acrylic polyol | Nuplex |
| Setal 1603 BA-78 | 125 | Polyester polyol | Nuplex |
| Methyl amyl ketone | 177.5 | Solvent | |
| Solvesso 100 | 72.5 | Solvent | ExxonMobil Chemical |
| BYK-315 | 1.75 | Leveling agent | BYK Chemie GmbH |
| BYK-332 (10% in butyl acetate) | 8.25 | Wetting agent | BYK Chemie GmbH |
| BYK-358 | 5.0 | Leveling agent | BYK Chemie GmbH |
| DBTL (1% in butyl acetate) | 75.0 | Catalyst | |
| TOTAL | 1627.5 | | |

Part B

The products of examples 11 to 16 are diluted by simple mixing according to the proportions given below, so as to obtain the same solids content for part B:

TABLE 11

| Example | Product example | Amount of product according to example (g) | Diluting solvent (g) |
|---|---|---|---|
| 17 | 11 | 34.7 | 20.4 |
| 18 | 12 | 34.7 | 20.4 |
| 19 | 13 | 34.7 | 20.4 |
| 20 | 14 | 34.6 | 20.4 |
| 21 | 15 | 34.6 | 20.4 |
| 22 | 16 | 34.7 | 20.4 |

The diluting solvent is composed of a mixture of butyl acetate and methyl amyl ketone in a ratio by weight of 52/48.

Adjustment of the Cup Viscosity Before Application

Parts A and B are intended to be applied in an NCO/OH ratio equal to 1.1 and to be brought back to the viscosity of 20-22 seconds, measured with the DIN 4 cup at 23° C. The adjustment of the cup viscosity is carried out with the diluting mixture having the composition given below.

TABLE 12

| Product | Amount (g) |
|---|---|
| Butyl acetate | 16.1 |
| Methyl amyl ketone | 133.8 |
| Solvesso 100 | 50.1 |

Parts A and B are mixed according to the proportions described in the table and the viscosity with the DIN 4 cup at 23° C. is measured. The viscosity is subsequently adjusted with the mixture of solvents described above.

The amounts used are as follows:

TABLE 13

| Example | Product example No. | Part A (g) | Part B (g) | Diluent (g) | Viscosity before dilution(s) | Viscosity after dilution(s) |
|---|---|---|---|---|---|---|
| 17 | 11 | 65.1 | 43.1 | 0 | 21.4 | 21.4 |
| 18 | 12 | 65 | 42.2 | 0 | 21.3 | 21.3 |
| 19 | 13 | 65.1 | 42.1 | 0 | 21.5 | 21.5 |
| 20 | 14 | 71.5 | 36.5 | 3.34 | 23.5 | 20.8 |
| 21 | 15 | 71.6 | 37.1 | 1.56 | 22.5 | 21.2 |
| 22 | 16 | 65 | 33.7 | 2.7 | 23 | 20.9 |

In contrast to the comparative examples, the examples of the invention do not require the addition of solvent in order to obtain the same application viscosity, which means that the ready-for-use compositions will comprise less in the way of volatile organic compounds (VOCs).

Measurement of the Pot Life

The pot life is measured as being the time necessary for the doubling of the viscosity.

The value is extrapolated from the Viscosity=f(time) curves. An excessively short pot life is problematic as it will not allow the applicator to have available sufficient time for the application before the parts A and B crosslink in the pot.

TABLE 14

| Example No. | Pot life (min) |
|---|---|
| 17 | 77 |
| 18 | 75 |
| 19 | 76 |
| 20 | 73 |
| 21 | 74 |
| 22 | 73 |

The examples of the invention exhibit comparable pot lives to the products of the comparative examples.

Measurement of the Film Properties/Application of the Varnish Formulation to a Sheet of Glass The compositions are applied to a sheet of glass (wet thickness=200 μm), subjected to evaporation of the solvents at ambient temperature for 20 minutes and then crosslinked at 60° C. for 30 minutes. The following properties are subsequently evaluated after 7 days.

Gloss

The gloss of a coating is one of the most usefully measurable properties. The principle is to direct a light beam, at an angle of 20°, 60° or 85°, onto the surface to be examined. The reflected rays are collected by a photoelectric cell. The apparatus gives, by virtue of a galvanometer, a value from 0 to 100 proportional to the gloss. A ceramic standard acts as reference and represents the maximum value. The gloss is expressed in % (or unit of gloss). The gloss is measured using a gloss-meter device (BYK) after drying for 7 days at 23° C. and 50% relative humidity.

TABLE 15

| | Gloss | | |
|---|---|---|---|
| Example | 60° | 20° | Haze |
| 17 | 98 | 96 | 22 |
| 18 | 97 | 95 | <20 |
| 19 | 98 | 97 | 24 |
| 20 | 98 | 93 | <20 |
| 21 | 99 | 98 | <20 |
| 22 | 99 | 98 | 24 |

All the films exhibit a glossy appearance and are characterized by the absence of haze.

Chemical Resistance

The chemical resistance with respect to numerous aggressive agents is evaluated. The film is exposed to cotton pads impregnated with various aggressive agents. After a period of time, a visual grading of the film is carried out by grading from 0 to 5 or 6 according to the aggressive agents (0=intact film, 5 or 6=destroyed film). In the following examples, the contact time is 1 h for all of the compounds, except for the water (16 h).

Drying at 60° C. for 30 min

TABLE 16

| Example | $H_2O$ | $NH_3$ (1% in water) | Ethanol (48% in water) | Acetic acid (10% in water) |
|---|---|---|---|---|
| 17 | 2 | 0 | 2 | 0 |
| 18 | 2 | 0 | 2 | 0 |
| 19 | 0 | 0 | 2 | 0 |
| 20 | 2 | 0 | 2 | 0 |
| 21 | 2 | 0 | 2 | 0 |
| 22 | 2 | 0 | 2 | 0 |

Example 19 according to the invention makes it possible to obtain properties of chemical resistances which are equivalent to those of the comparative products.

Application Examples 23 to 27

Measurement of the Film Properties/Application of the Varnish formulation to a Metal Plate A coat of primer is applied, with an air gun, to type R46 steel plates (sold by Q-Panel) which have been degreased beforehand.

The primer is composed of a part A and of a part B which are mixed before use and diluted with a part C (solvent).

The composition by weight of the primer is as follows:

TABLE 17

| Part A (% by weight) | Part B (% by weight) | Part C (% by weight) |
|---|---|---|
| 66.5 | 16.6 | 16.9 |

Part A: 285-60 VOC gray primer from Glasurit
Part B: curing agent with the following composition:

TABLE 18

| Product | % by weight | Supplier |
|---|---|---|
| Tolonate HDB 75 MX (polyisocyanate comprising a biuret structure based on HDI) | 58.7 | Perstorp |
| Xylene | 2.7 | |
| Ethylbenzene | 1 | |
| n-Butyl acetate | 25 | |
| Isobutyl acetate | 10 | |
| Methoxypropyl acetate | 2.6 | |

Part C: mixture of solvents with the following composition:

TABLE 19

| Product | % by weight |
|---|---|
| Xylene | 20.6 |
| Ethylbenzene | 7.4 |
| n-Butyl acetate | 44.1 |
| Isobutyl acetate | 20.6 |
| Methoxypropyl acetate | 7.3 |

The plates are crosslinked at 60° C. for 30 min. A gun is used to subsequently apply a base coat according to the following composition by weight:

TABLE 20

| Autowave AW MM 00 white base from Akzo Nobel (% by weight) | Water (% by weight) |
|---|---|
| 90 | 10 |

The base is dried at 23° C. for 3 hours and then the coat of varnish according to the compositions of examples 7 to 11 is applied with a gun.

The plates are then crosslinked for 7 days in a controlled atmosphere (23° C., 50% relative humidity).

At the end of these 7 days, the following evaluations are carried out:

Test of Impact Strength by Dropping a Ball

It is a question of evaluating the impact strength of a film of paint or varnish on a steel plate by observing the appearance of cracks or detached parts.

The test consists in subjecting the coating to the impact of a striking element with specific dimensions and a specific weight, the drop height of which can be adjusted. The maximum height from which the film of paint is damaged by the impact is thus determined.

Two ball drop test devices are available (Erichsen), one equipped for the AFNOR impacts, the reference for which is ISO 6272 (weight of 1000 g), and the other for the ASTM impacts, the reference for which is D 2794 (weight of 910.3 g).

The result given indicates the maximum height obtained before the appearance of cracks:

TABLE 21

| Example | Composition example | Primer thickness (μm) | Base thickness (μm) | Varnish thickness (μm) | AFNOR impact (cm) | ASTM impact (cm) |
|---|---|---|---|---|---|---|
| 23 | 17 | 49 | 50 | 50 | 100 | 80 |
| 24 | 18 | 52 | 50 | 40 | 100 | 80 |
| 25 | 19 | 53 | 40 | 35 | 100 | 80 |
| 26 | 20 | 65 | 50 | 50 | 100 | 80 |
| 27 | 21 | 48 | 50 | 42 | 100 | 80 |

All the products pass the test.

Rub Test (Test of Resistance to Rubbing in the Presence of a Solvent)

The film of paint or of varnish is subjected to the repeated rubbing actions of a cotton pad impregnated with solvent (methyl ethyl ketone) and the part tested is subsequently examined. The T/F number (to +/−10) from which the film becomes tacky or the T/F number (to +/−10) from which the film begins to be destroyed is recorded.

If the film has not been dissolved during the test, ">200" is shown and, if there is loss in gloss visible to the naked eye (LG), this is specified by recording ">200 LG".

TABLE 22

| Example | Product example | Composition example | Primer thickness (μm) | Base thickness (μm) | Varnish thickness (μm) | Rub test (T/F number) |
|---|---|---|---|---|---|---|
| 23 | 11 | 17 | 49 | 49 | 50 | >200 |
| 24 | 12 | 18 | 50 | 50 | 35 | >200 |
| 25 | 13 | 19 | 53 | 40 | 35 | >200 |
| 26 | 14 | 20 | 46 | 46 | 64 | >200 |
| 27 | 15 | 21 | 48 | 50 | 42 | >200 LG |

Application Examples 28 to 35

The products resulting from examples 11 to 13 are used to prepare self-emulsifiable compositions according to the following proportions.

Examples 31 and 35 are comparative examples using the commercial reference of Tolonate HDT LV2.

TABLE 23

| Example | Product of example | % by weight of example product | % by weight of Tolonate HDT | % by weight of ethoxylated phosphate ester | % by weight of DMCHA | % by weight of X- EZM 502 |
|---|---|---|---|---|---|---|
| 28 | 11 | 33.45 | 14.61 | 1.55 | 0.39 | 50.00 |
| 29 | 12 | 34.92 | 13.20 | 1.50 | 0.38 | 50.00 |
| 30 | 13 | 33.48 | 14.60 | 1.54 | 0.38 | 50.00 |
| 31 | 15 | 33.35 | 14.67 | 1.58 | 0.40 | 50.01 |
| 32 | 11 | 11.15 | 4.87 | 0.52 | 0.13 | 83.33 |
| 33 | 12 | 11.64 | 4.40 | 0.50 | 0.13 | 83.33 |
| 34 | 13 | 11.16 | 4.87 | 0.51 | 0.13 | 83.33 |
| 35 | 15 | 11.12 | 4.89 | 0.53 | 0.13 | 83.33 |

In a first step, the phosphate ester is neutralized by the dimethylcyclohexylamine by mixing the two products with stirring. The other ingredients are added to the salt thus formed and mixing is carried out for one hour using a pot roller.

Preparation of the Formulation of the Acrylic Varnish

This concerns a two-component varnish formulation for general industrial application.

A mixture of additives is first of all prepared, according to the following composition by weight:

TABLE 24

| Reference | % by weight | Use | Supplier |
|---|---|---|---|
| Butyl glycol | 43.89 | Cosolvent | |
| Dehydran 1293 | 20.58 | Defoamer | Cognis |
| BYK 301 | 13.12 | Leveling agent | BYK Chemie |
| BYK 348 | 22.39 | Wetting agent | BYK Chemie |

Part A is subsequently prepared.

Preparation of Part A

The compounds are introduced with stirring (Dispermat stirring device) in the order of the following table:

TABLE 25

| Reference | % by weight | Use | Supplier |
|---|---|---|---|
| Setalux 6511 AQ47 | 50.87 | Polyol | Nuplex |
| Setalux 6520 AQ45 | 17.67 | Polyol | Nuplex |
| H₂O (demineralized) | 7.95 | | |
| DMEA (dimethylethanolamine) | 0.38 | Neutralizing agent | |
| Mixture of additives | 2.41 | | |
| BGA (butyl glycol acetate) | 7.04 | Solvent | |
| H₂O (demineralized) | 13.68 | | |
| total | 100.00 | | |

Preparation of Part B

The products of examples 28 to 35 are diluted by simple mixing with Proglyde DMM (Dow) according to the proportions given below.

TABLE 26

| Example | Product of example | % by weight of example product | % by weight of DMM |
|---|---|---|---|
| 28 | 11 | 82.6 | 17.4 |
| 29 | 12 | 82.6 | 17.4 |
| 30 | 13 | 82.6 | 17.4 |
| 31 | 15 | 80 | 20 |
| 32 | 11 | 82.6 | 17.4 |
| 33 | 12 | 82.6 | 17.4 |
| 34 | 13 | 82.6 | 17.4 |
| 35 | 15 | 80 | 20 |

Part A and part B are subsequently mixed with manual stirring in the following proportions, so as to keep the NCO/OH ratio constant for all the preparations:

TABLE 27

| Example | % by weight of Part A | % by weight of Part B |
|---|---|---|
| 28, 29, 30, 32, 33, 34 | 77 | 33 |
| 31, 35 | 80 | 20 |

The quality of the mixing is evaluated according to the following criteria:

Time necessary (s) in order to obtain a homogeneous mixture. This time is evaluated in seconds.

The presence of filaments or particles (graded from 0 for the absence to 5 for a large number)

The appearance of a deposit after standing for 30 minutes (graded from 0 for the absence of deposit to 5 for a large deposit)

TABLE 28

| Example | Mixing time (s) | Filaments | Particles | Deposit after 30' |
|---|---|---|---|---|
| 28 | 30 | 0 | 0 | 0 |
| 29 | 30 | 0 | 0 | 0 |
| 30 | 30 | 0 | 0 | 0 |
| 31 | 30 | 0 | 0 | 0 |
| 32 | 30 | 0 | 0 | 0 |
| 33 | 30 | 0 | 0 | 0 |
| 34 | 30 | 0 | 0 | 0 |
| 35 | 30 | 0 | 0 | 0 |

The compositions are very easily dispersible by hand and remain stable. The products resulting from the invention make it possible to prepare self-emulsifiable compositions without problems.

Furthermore, the increase in the proportion of the products of the invention in the formulation described in table 23 makes it possible to improve the gloss and the haze of the film, a sign of an improved compatibility.

TABLE 29

| Example | % product of the invention | Haze | Gloss (20°) |
|---|---|---|---|
| 28 | 33.45 | 63 | 86 |
| 30 | 33.48 | 80 | 85 |
| 31 | 33.35 | 89 | 82 |
| 32 | 11.15 | 251 | 67 |
| 34 | 11.16 | 229 | 66 |
| 35 | 11.12 | 238 | 66 |

Example 36

Impact of Sodium in the Carboxylate Form on the Synthesis of the Allophanate with an Amount of Isocyanurate Trimer of Less than 5%

546 g of HDI (3.25 mol), then 193 g of Rhodasurf LA 30 (0.54 mol) and 0.19 g of bismuth tris(2-ethylhexanoate) (catalyst) ($1.06 \times 10^{-4}$ mol) (solution comprising 12% of bismuth in n-butanol) are charged, under a stream of nitrogen, to a three-necked reactor equipped with a stirrer. The amount of sodium in the acetate form present in the Rhodasurf LA 30 is 66 ppm. The reaction medium is heated in order to reach the temperature of 140° C. in 96 minutes. The reaction medium is maintained at this temperature for approximately 1 hour. The NCO content of the reaction medium is regularly measured by the dibutylamine assaying method. The reaction is halted by the addition of 0.68 g of para-toluenesulfonic acid formulated in 2-ethylhexanol when the NCO content of the reaction medium corresponds to the theoretical content expected. After 30 minutes, the temperature of the reaction medium is allowed to return to ambient temperature.

The NCO content of the starting reaction medium is 0.884 mol per 100 g. The NCO content of the final reaction medium is 0.762 mol of NCO per 100 g.

Two successive thin film distillations are subsequently carried out under vacuum (under 1 mmHg approximately) at the temperature of 160° C. in order to remove most of the unreacted monomer.

The amount of product recovered after distillation is 381 g. The NCO content is 0.267 mol per 100 g, i.e. 11.21% by weight.

The distribution of oligomers obtained after separation by gel permeation chromatography and infrared analysis is given below:

| Type of oligomer | % by weight |
|---|---|
| HDI | 0.55 |
| True HDI dimer (2 HDI chains and one uretidinedione ring) | 0.25 |
| Rhodasurf LA 30 and HDI allophanate | 27.7 |
| Isocyanurate trimer | 2.4 |
| Heavy oligomers essentially composed of allophanate structures | 69 |

It is thus found that the isocyanurate trimer content is indeed less than 5% by weight.

Example 37 (Comparative)

The procedure is the same as in example 36 but use is made of a Rhodasurf LA 30 comprising a sodium content of 400 ppm, the sodium being in the acetate form.

540 g of HDI (3.2 mol), then 200 g of Rhodasurf LA 30 (0.55 mol) and 0.2 g of bismuth tris(2-ethylhexanoate) ($1.06 \times 10^{-4}$ mol) as a solution in n-butanol comprising 12% of bismuth are charged, under a stream of nitrogen, to a three-necked reactor equipped with a stirrer. The temperature of the reaction medium is increased. After 10 minutes, the temperature of the reaction medium reaches 70° C. Surprisingly, the temperature suddenly increases exponentially to reach the temperature of 195° C. in one minute. The reaction medium then sets solid. The analysis of the reaction medium shows the predominant formation of isocyanurate trimers and isocyanurate polytrimers besides HDI and n-butyl allophanates.

The product thus does not correspond to the expected product.

Example 38 (Comparative)

The procedure is the same as in example 36 but use is made of a Rhodasurf LA 30 comprising a sodium content of 250 ppm, the sodium being in the acetate form.

530 g of HDI (3.2 mol), then 205 g of Rhodasurf LA 30 (0.55 mol) and 0.2 g of bismuth tris(2-ethylhexanoate) ($1.06 \times 10^{-4}$ mol) as a solution in n-butanol comprising 12% of bismuth are charged, under a stream of nitrogen, to a three-necked reactor equipped with a stirrer. The temperature of the reaction medium is increased. After 15 minutes, the temperature of the reaction medium reaches 80° C. Surprisingly, an uncontrollable reaction exotherm is observed with the reaction medium setting solid. The analysis of the reaction medium shows the predominant formation of isocyanurate trimers and isocyanurate polytrimers besides HDI and n-butyl allophanates.

The product thus does not correspond to the expected product.

Example 39 (Comparative)

200 g of Rhodasurf LA 30, the level of sodium in its acetate form of which is 400 ppm, are passed through an ion-exchange resin comprising pendent $SO_3H$ groups. The sodium content after passing through the resin is 0 ppm.

A synthesis is carried out as for example 36.

The kinetics are greatly slowed down and the addition of the para-toluenesulfonic acid is carried out after 5 hours of reaction.

It is found that the absence of sodium in the acetate form in the reaction medium results in an increase in the reaction time.

Example 40

Process with Use of Antioxidant Compounds 2416 g of hexamethylene diisocyanate (HDI) (14.37 mol), then 480 g of Rhodasurf LA 30 (1.34 mol) and 33.2 g of solution of bismuth tris(2-ethyl-hexanoate) ($4.32 \times 10^{-4}$ mol) in n-butanol (concentration: 0.831% by weight) are charged, under a stream of nitrogen, to a three-necked reactor equipped with a stirrer.

The amount of sodium in the acetate form present in the Rhodasurf LA 30 is 18 ppm.

0.89 g of a mixture of antioxidants composed of tributyl phosphite and 2,6-di(tert-butyl)-4-methylphenol (respectively 66.6/33.4% by weight) is added to the reaction medium. The reaction medium is heated in order to reach the temperature of 140° C. in 114 minutes. The NCO content of the reaction medium is regularly measured. After 114 minutes, the NCO content of the reaction medium is equal to 0.914 mol of NCO per 100 g. 2.8 g of para-toluenesulfonic acid as a 10% solution in 2-ethylhexanol (the para-toluenesulfonic acid/bismuth metal molar ratio is 3.4). After 162 minutes, the NCO content is 0.907 mol per 100 g. After 30 minutes, the temperature of the reaction medium is allowed to return to ambient temperature. The coloration of the reaction medium is 35 hazen.

The reaction medium is subsequently distilled in order to remove the HDI monomer. The weight of product recovered is 1159 g. The NCO content of the reaction medium is 0.311 mol per 100 g, i.e. 13.062%. The bismuth is reencountered to more than 95% in the final product. The level of sulfur present in the reaction medium is 16 ppm. The viscosity of the reaction medium is 128 mPa·s at 25° C.

The distilled HDI is subsequently recycled; the level of sulfur present in the HDI is 2.8 ppm.

The composition of the reaction medium is presented below:

| Constituents | % by weight |
| --- | --- |
| HDI monomer | <0.05 |
| Ethylhexyl and HDI carbamate | 0.2 |
| HDI dimer | 0.3 |
| n-Butyl and HDI allophanate | 10.9 |
| LA30 and HDI allophanate | 28.4 |
| HDI trimer | 0.8 |
| Heavy products essentially comprising allophanate structures | 59.4 |

Example 41

Process with Use of Antioxidant Compounds

The procedure is the same as for example 40 but the reaction takes place at 85° C.

2402 g of hexamethylene diisocyanate (HDI) (14.28 mol), then 481 g of Rhodasurf LA 30 (1.34 mol) and 33.3 g of solution of bismuth tris(2-ethylhexanoate) ($8.28 \times 10^{-4}$ mol) in n-butanol (concentration: 1.589% by weight) are charged, under a stream of nitrogen, to a three-necked reactor equipped with a stirrer. The amount of sodium in the acetate form present in the Rhodasurf LA 30 is 30 ppm. 2.2 g of a mixture of antioxidants composed of tributyl phosphite and 2,6-di(tert-butyl)-4-methylphenol (respectively 66.6/33.4% by weight) are added to the reaction medium. The reaction medium is heated in order to reach the temperature of 85° C. in 55 minutes. The NCO content of the reaction medium is regularly measured. After 136 minutes, the NCO content of the reaction medium is equal to 0.84 mol of NCO per 100 g and, after 142 minutes, 2.8 g of para-toluenesulfonic acid as a 10% solution in 2-ethylhexanol (para-toluenesulfonic acid/bismuth metal molar ratio=3.4) are added in order to block the reaction. 30 minutes after the addition of the blocker, the NCO content is 0.83 mol per 100 g. After 30 minutes, the temperature of the reaction medium is allowed to return to ambient temperature. The coloration of the reaction medium is 15 hazen.

The reaction medium is subsequently distilled in order to remove the HDI monomer. The weight of product recovered is 1141 g. The NCO content of the reaction medium is 0.296 mol per 100 g, i.e. 12.43%. The viscosity of the reaction medium is 148 mPa·s at 25° C.

The distilled HDI is subsequently recycled; the level of sulfur present in the HDI is 2.8 ppm.

The composition of the reaction medium before distillation is presented below:

| Constituents | % by weight |
| --- | --- |
| HDI monomer | 0.2 |
| Ethylhexyl and HDI carbamate | 0.2 |
| HDI dimer | <0.1 |
| n-Butyl and HDI allophanate | 10.8 |
| Rhodasurf LA 30 and HDI allophanate | 25.7 |
| HDI trimer | 0.7 |
| Heavy products comprising allophanate structures | 62.3 |

The present invention, therefore, is well adapted to carry out the objects and attain the ends and advantages mentioned, as well as others inherent therein. While the invention has been depicted and described and is defined by reference to particular preferred embodiments of the invention, such references do not imply a limitation on the invention, and no such limitation is to be inferred. The invention is capable of considerable modification, alteration and equivalents in form and function, as will occur to those ordinarily skilled in the pertinent arts. The depicted and described preferred embodiments of the invention are exemplary only and are not exhaustive of the scope of the invention. Consequently, the invention is intended to be limited only by the spirit and scope of the appended claims, giving full cognizance to equivalents in all respects.

What is claimed is:

1. A process for the preparation of an allophanate of an isocyanate comprising reacting a polyisocyanate with an ethoxylated fatty alcohol, comprising at most 10 ethylene oxide units on average, in the presence of a bismuth tricarboxylate catalyst and an alkali or alkaline earth metal carboxylate co-catalyst, said bismuth tricarboxylate being present in an amount of 0.001-0.1%, as moles of bismuth with respect to the moles of ethoxylated fatty alcohol, and said alkali/alkaline earth metal carboxylate being present in an amount of 0.5 to 100 ppm, with respect to the amount of ethoxylated fatty alcohol.

2. The process as claimed in claim 1, wherein the bismuth tricarboxylate is selected from the group consisting of bismuth triacetate, bismuth tri(2-ethylhexanoate), bismuth tridecanoate and bismuth tripalmitate.

3. The process as claimed in claim 1, wherein the bismuth tricarboxylate is bismuth tri(2-ethylhexanoate).

4. The process as claimed in claim 1, wherein the alkali/alkaline earth metal carboxylate is sodium carboxylate or potassium carboxylate.

5. The process as claimed in claim 4, wherein said sodium carboxylate is sodium acetate.

6. The process as claimed in claim 1, wherein the bismuth tricarboxylate is present in an amount of 0.001-0.05%, as moles of bismuth with respect to the moles of ethoxylated fatty alcohol.

7. The process as claimed in claim 1, wherein the alkali/alkaline earth metal carboxylate is present in an amount of 1-70 ppm with respect to the amount of ethoxylated fatty alcohol.

8. The process as claimed in claim 1, wherein the polyisocyanate is an isocyanate monomer.

9. The process as claimed in claim 1, wherein the polyisocyanate monomer(s) correspond to at least one of the following conditions:
- at least one of the NCO functional groups is linked to a hydrocarbon backbone via a saturated ($sp^3$) carbon;
- at least one of said saturated ($sp^3$) carbons is substituted by at least one hydrogen;
- all the intermediate carbons from which the isocyanate functional groups are linked to the hydrocarbon backbone are saturated ($sp^3$) carbons, at least partially, substituted by a hydrogen.

10. The process as claimed in claim 1, having an NCO/OH ratio greater than 2.

11. The process as claimed in claim 1, wherein the allophanates correspond to the general formula (II):

wherein:

$R_4$ and $R_6$ are identical or different and represent a hydrocarbon group, an aliphatic, cycloaliphatic, heterocyclic or aromatic hydrocarbon group, comprising a true or derived isocyanate functional group, and $R_5$ represents the ethoxylated alcohol.

12. The process as claimed in claim 1, comprising preparation of a mixture of allophanates which comprises a monoallophanate.

13. The process as claimed in claim 1, wherein the polyisocyanate is a urethane.

14. The process as claimed in claim 1, wherein the reaction of the polyisocyanate with the ethoxylated fatty alcohol is carried out in addition in the presence of an antioxidant compounds.

15. An allophanate or mixture of allophanates obtained by the process as claimed in claim 1.

16. A composition comprising at least one true polyfunctional tricondensate isocyanate and an allophanate(s) or mixtures of allophanates obtained by the process as claimed in claim 1.

17. The composition as claimed in claim 16, wherein the tricondensate polyfunctional isocyanates correspond to the following general formula:

wherein A represents:
an isocyanurate group of formula:

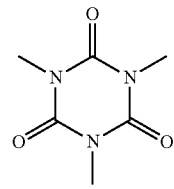

an iminooxadiazinediones of formula:
an oxadiazinetrione of formula:

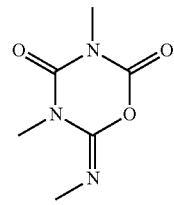

a biuret group of formula:

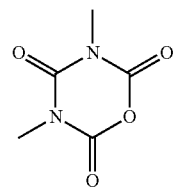

B being H or a group comprising carbon and hydrogen and optionally further other atoms; or
a group of formula:

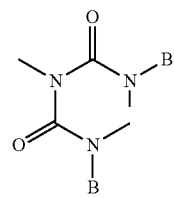

wherein n is an integer from 3 to 4,
and wherein $R_1$, $R_2$, and $R_3$, and Q are independently selected aliphatic, cycloaliphatic, heterocyclic or aromatic groups comprising a true or derived isocyanate functional group,
and m is an integer from 0 to 2.

18. The composition as claimed in claim 16, comprising at least one true isocyanurate polyisocyanate.

19. The composition as claimed in claim 16, wherein it comprises at least 5% of an allophanate or mixtures of allophanates obtained by the process as claimed in claim 1.

20. The composition as claimed in claim 16, wherein it comprises at least one true polyfunctional tricondensate isocyanate and at least one monoallophanate, said composition comprising less than 15% of tricondensate allophanates with respect to the total weight of the composition.

21. The composition as claimed in claim 16, comprising at least one true polyfunctional tricondensate isocyanate and at least one allophanate, said composition corresponding to at least one of the following conditions:
- a weight ratio allophanate/(allophanate+true trimer) between 2.5 and 99%
- the tricondensates result from a tricondensation reaction for which the conversion rate of the identical or different isocyanate monomer or monomers resulting in polyfunctional tricondensate polyisocyanates comprised in the composition is greater than 8%,
- at least 1% by weight and at most 99% by weight of biuret, is present.

22. The process according to claim 1 comprising reacting at least two polyisocyanates and preparing a mixture of different allophanates.

23. The process according to claim 1 comprising reacting at least two ethoxylated fatty alcohols and preparing a mixture of different allophonates.

24. The composition according to claim 17 wherein Q is alkyl.

25. The process as claimed in claim 1, wherein said polyisocyanate is a diisocyanate or a triisocyanate.

26. The process as claimed in claim 25, wherein said diisocyanate is hexamethylene diisocyanate.

27. The process as claimed in claim 1, wherein said ethoxylated fatty alcohol is ethoxylated $C_{10}$-$C_{18}$ fatty alcohol.

28. The process as claimed in claim 1, wherein said ethoxylated fatty alcohol is ethoxylated $C_{12}$-$C_{14}$ fatty alcohol.

29. The process as claimed in claim 1, wherein said ethoxylated fatty alcohol comprises less than 5 ethylene oxide units on average.

30. The process as claimed in claim 1, wherein said ethoxylated fatty alcohol comprises 2 or 3 ethylene oxide units on average.

31. The process as claimed in claim 1, wherein said process yielding a reaction mixture comprising less than 5% by weight of isocyanurate trimer.

* * * * *

UNITED STATES PATENT AND TRADEMARK OFFICE
CERTIFICATE OF CORRECTION

PATENT NO. : 8,716,426 B2
APPLICATION NO. : 13/133477
DATED : May 6, 2014
INVENTOR(S) : Jean-Marie Bernard, Johannès Schwarz and Philippe Olier It is certified that error appears in the above-identified patent and that said Letters Patent is hereby corrected as shown below:

Title page, (75), The second and third Inventors' address reading "Johannès Schwarz, Lyons (FR)" should read --Johannès Schwarz, Lyon (FR)--, and "Philippe Olier, Lyons (FR)" should read --Philippe Olier, Lyon (FR)--

Title page, (86), The PCT No.: reading "PCT/FR2009/002443" should read --PCT/FR2009/052443--

In the Claims:
Column 32, line 22, Claim 17, delete "an iminooxadiazinediones of formula:" and insert at
Column 32, line 12, Claim 17 between two formulas Signed and Sealed this
Twenty-sixth Day of May, 2015

Michelle K. Lee
*Director of the United States Patent and Trademark Office*